INVENTOR.
PAUL E. HARRIS
BY Philip Schneider
Louis B. Applebaum
ATTORNEYS

INVENTOR.
PAUL E HARRIS
BY Philip Schneider
Louis B. Applebaum
ATTORNEYS

United States Patent Office 3,181,013
Patented Apr. 27, 1965

3,181,013
SOLID-STATE TWO STAGE BOXCAR CIRCUIT EMPLOYED AS A PULSE STRETCHER

Paul E. Harris, Syracuse, N.Y., assignor, by mesne assignments, to the United States of America as represented by the Secretary of the Navy Filed Apr. 3, 1963, Ser. No. 270,478
8 Claims. (Cl. 307—88.5)

This invention relates to pulse-stretching circuits and especially to a solid-state boxcar circuit.

A boxcar circuit is a type of selective pulse stretcher which permits sampling and stretching of any desired segment of a video train. These circuits are widely used in radar applications. There is a need for solid-state boxcar circuits rather than the vacuum-tube types presently employed since the use of solid-state circuits generally provide advantages in size, weight and power requirements. The problem which has prevented the use of transistorized boxcar circuits in the past has been the low input impedance of their isolator sections which results in "droop" in the output pulse of the boxcar. Droop in the output of a boxcar circuit is objectionable because it results in a noise component having a saw-tooth waveshape and a fundamental frequency which is the same as that of the pulse repetition frequency.

The leakage which causes boxcar droop is discharge of the storage capacitor through the back resistance of the switching diode in parallel with the isolator input resistance. The principal weakness lies in the transistorized isolator, a circuit which is difficult to design with a stable input resistance comparable to the back resistance of available diodes.

The objects and advantages of the present invention are accomplished by utilizing a two-stage boxcar circuit, in which the second-stage isolator utilizes feedback, A.C. coupling and bootstrapping techniques to achieve a high input impedance, and the first-stage switch employs diodes with a short recovery time to prevent degradation of the stored signal.

An object of the present invention is to provide a boxcar circuit which utilizes solid-state instead of vacuum tube components.

Another object is to provide a solid-state boxcar circuit capable of signal-to-noise ratios which are as good as those attainable with present-day vacuum-tube boxcar circuits.

A further object is to provide a solid-state boxcar circuit which is relatively small and light in weight, and has low power drain requirements in comparison to similar vacuum-tube boxcar circuits.

Other objects and many of the attendant advantages of this invention will be readily appreciated as the same becomes better understood by reference to the following detailed description when considered in connection with the accompanying drawings wherein.

Figure 1:
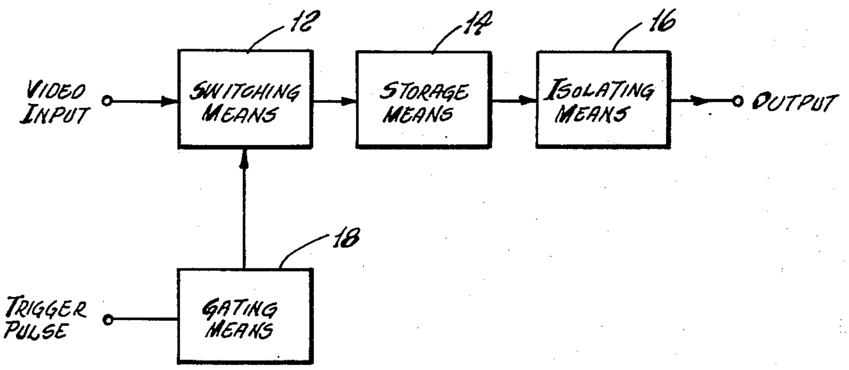
FIG. 1 is a block diagram showing a generalized boxcar circuit.

FIG. 1 shows the elements of a conventional boxcar circuit. The switching means 12 is normally closed. It is opened by a gating pulse from the gating means 18, the latter being actuated by a trigger pulse input. The opening of the switching means 12 permits passage to the storage means 14 of the video signal which is an input to the switching means 12. The storage means 14 charges to the value of the video signal during the sampling time, i.e., during the period of the gating pulse. The switching means 12 is then closed, usually by the termination of the gating pulse. The audio output then consists of the fixed voltage to which the storage means 14 has been charged. The isolating means 16 is employed as a high impedance between the storage means 14 and the output load circuit to prevent discharge of the storage means 14 by a low-impedance load circuit. The output consists of a series of long steps whose amplitudes correspond to the amplitude of the video input at the time of each associated sampling.

Figure 2:
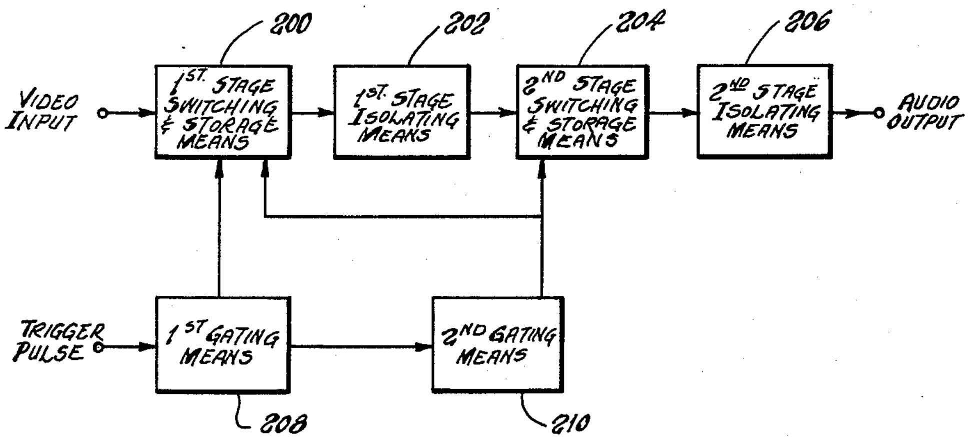
FIG. 2 is a block diagram of the present invention.

The present invention is shown in block form in FIG. 2. It can be seen that the boxcar circuit has been broken into two stages comprising a first stage switching and storage means 200, a first stage isolating means 202, a second stage switching and storage means 204, a second stage isolating means 206, a first gating means 208 and a second gating means 210. The first gating means 208 is actuated by a trigger pulse to produce a ½-microsecond pulse which opens the switch in the first stage switching and storage means and allows the storage element to charge to the value of the video pulse at that time. The end of the ½-microsecond pulse triggers the second gating means 210 into producing a 10-microsecond pulse. The 10-microsecond pulse opens the switch in the second stage switching and storage means 204 for a 10-microsecond period, during which time the voltage on the storage element of the first stage switching and storage means 200 is passed through the first stage isolating means 202 and the second stage switch to the second stage storage element. The second stage storage element charges to a value substantially the same as that of the first stage storage element except for some small voltage drops due to forward resistances of transistors and diodes. Again, this is substantially the value of the sampled video input at the time of sampling.

The switch in the second stage switching and storage means 204 is closed by termination of the 10-microsecond pulse and, until the next 10-microsecond pulse occurs, the voltage to which the second storage element has been charged is passed through the second isolating means 206 to the audio output terminal. The next 10-microsecond pulse occurs approximately 500 microseconds later. Thus, it may be said that the original ½-microsecond pulse has been stretched into a 500 microsecond pulse.

Figure 3:
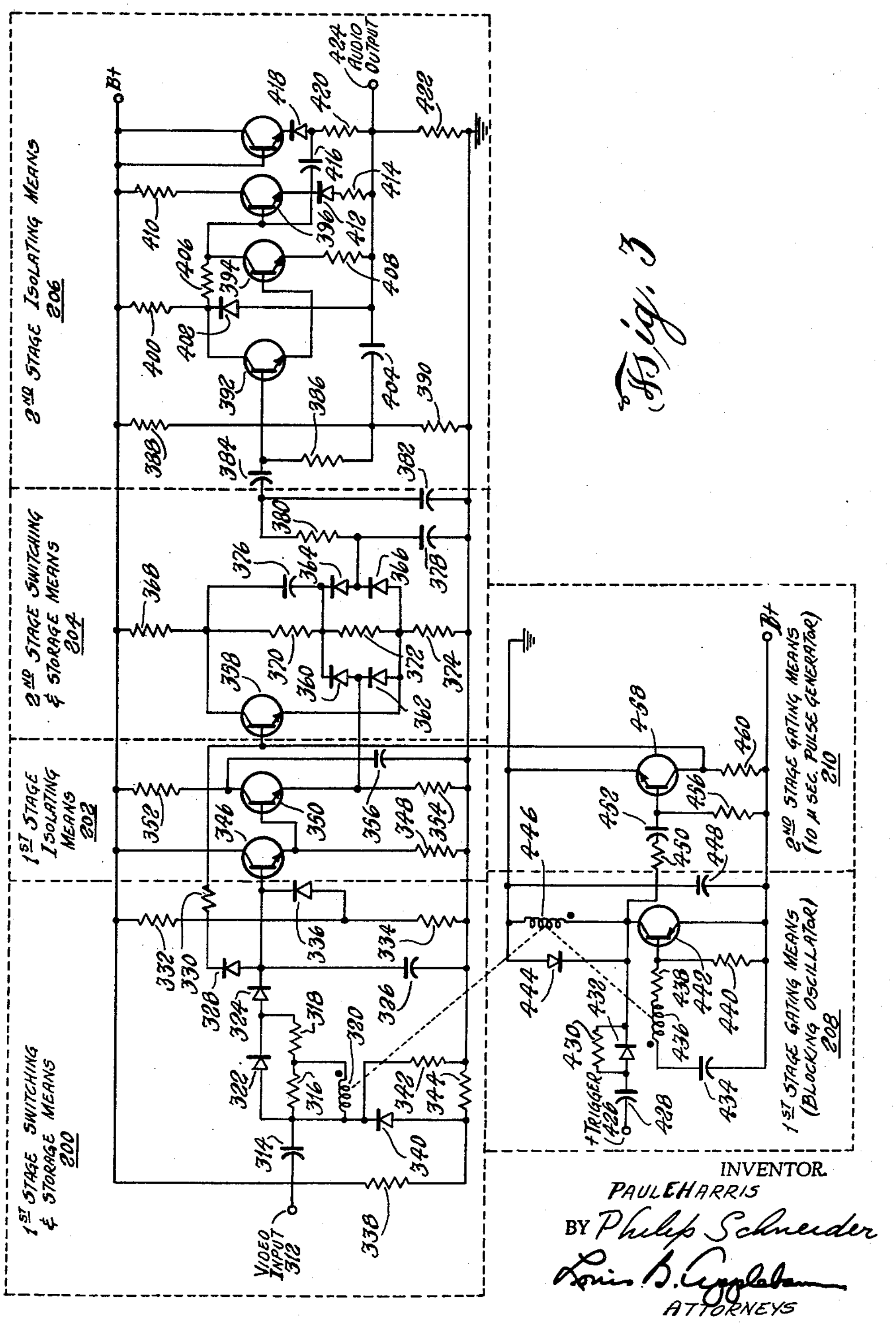
FIG. 3 is a schematic circuit diagram of a preferred embodiment of the present invention.

FIG. 3 shows the schematic circuit diagram of a preferred embodiment of the invention. The circuit has been broken down by dotted lines into blocks corresponding to those shown in FIG. 2. The first gating means 208 comprises a conventional blocking oscillator circuit utilizing a transistor 442 and producing a ½-microsecond output pulse which is introduced into the first switching and storage means by winding 320 of the blocking oscillator transformer. The ½-microsecond pulse is also fed as an input to the second gating means which comprises a single transistor pulse stretcher the output of which is a 10-microsecond pulse. Condenser 452 is the stretch capacitor and the base-emitter junction of transistor 458 serves as the stretch diode. The output pulse appears at the collector of transistor 458 and is applied to the base of transistor 358 in the second switching and storage means 204 and to the reset diode 328 in the first switching and storage means 200.

The video input at terminal 312 is passed to the base of the first of the two transistors 346 and 350 which comprise the first isolating means 202. These two transistors 346 and 350 are components of two cathode-follower circuits which are in series. The video input signal is passed to the base of transistor 346 through a blocking condenser 314, a pair of seriesed resistors 316 and 318 and a crystal diode 324 which may be called the switch diode.

The switching means in the first stage switching and storage means is comprised of switch diode 324, winding 320 of the blocking oscillator transformer and reset diode 328. Biasing in the absence of a trigger pulse is such that the switch diode 324 remains nonconducting even when the largest permissible video input signal (approximately 6 volts) is present. Biasing (approximately +7 volts) is provided by catch diode 336 and bias network resistors 332 and 334; the quiescent voltage level across the storage capacitor 326 is determined by these components.

Firing of the blocking oscillator by the input trigger produces a ½-microsecond voltage pulse across the winding 320 of the blocking oscillator transformer which is in the first stage switching and storage means 200. Resistor 318 and Zener diode 322 limit the amplitude of the pulse to about 8 volts which is sufficient to cause the switch diode 324 to conduct. The video input is in series with this diode and with the storage capacitor 326, so that the storage capacitor 326 charges to the sum of pulse voltage and whatever voltage value the video signal has during the ½-microsecond sampling period. The ending of the ½-microsecond pulse closes the switch diode 324.

The beginning of the 10-microsecond pulse, which occurs simultaneously with the ending of the ½-microsecond pulse, closes the reset diode 328 since the positive pulse applied to the cathode element of the diode is higher in amplitude than the potential at the anode of the switch diode, the anode potential being derived from the storage capacitor 326. At the same time, the potential on the top plate of the storage capacitor 326 (applied to cathode of catch diode 336) is higher than the potential at the junction of bias network resistors 332 and 334 (applied to anode of catch diode 336) so that the catch diode 336 is also closed. Thus, the voltage across storage capacitor 326 remains constant and is applied to the first isolating means 346 during the period of the 10-microsecond pulse.

The 10-microsecond pulse is also applied to the normally nonconducting transistor 358 of the second switching and storage means 204 and causes this transistor to conduct. The second switching and storage means 204 includes a bipolar electronic switch consisting of the four diodes 360, 362, 364 and 366. This bipolar electronic switch is normally close since the diodes are reverse biased by biasing network resistors 368, 370, 372 and 374. Conduction of the transistor 358 in this stage changes the bias on these switch diodes to forward biasing, allowing all diodes to conduct and opening the switch. The output signal at the emitter electrode of the second transistor 350 of the first isolating means 202 is passed through the bipolar diode switch to the storage capacitor 378 of the second switching and storage means 204 for the 10-microsecond period during which the 10-microsecond pulse is applied to the second switching and storage means 204. During this period, the second stage storage capacitor 378 charges to the value (approximately) of the voltage across the first stage storage element 326.

The end of the 10-microsecond pulse drops the potential on the cathode electrode of the reset diode 328 in the first stage switching and storage means 200 to a value which allows discharge of the first stage storage element 326 to its quiescent value (as determined by catch diode 336 and bias network resistors 332 and 334). At the same time, conduction of the transistor 358 in the second stage switching and storage means 204 is cut off, thereby closing the bipolar diode switch and preventing the output signal from the first stage isolating means 202 from continuing to charge the second stage storage element 378. The voltage of the second stage storage element 378 is applied to the second stage isolating means 206 through an integrating network and coupling capacitor 384. The integrating network comprises resistor 380 and condenser 382 and is employed to suppress transients which arise in the bipolar diode switch.

The second stage isolating means achieves high input resistance in a transistor amplifier by applying feedback, A.-C. coupling and bootstrapping techniques. (An early application of the feedback technique was reported by Texas Instruments, Inc., in its "New Parameter News," vol. 1, No. 4, January 1959.) Transistor 392 serves as an input emitter follower. Transistors 394, 396 and 398 form a multiple stage, high gain, current amplifier driving the audio output terminal 424. Since this same output terminal is the emitter return of the input transistor 392, the feedback factor is almost 100%, and the voltage gain between the base of the input transistor 392 and the output terminal 424 is nearly unity. Unity gain between base and emitter implies an infinite effective base-emitter resistance. Thus, voltage gain is traded for high input impedance. The function of the Zener diode 402 is to bootstrap the collectors of transistors 392 and 394, thus reducing the input loading effect of their collector-to-base impedance.

Zener diodes 412 and 418 establish appropriate biases for transistors 396 and 398. Capacitor 416 suppresses possible parasitic oscillations.

Since transistors are current-operated devices, input transistor 392 would draw a small D.-C. current from the storage means 378 if the second stage isolating means 206 were D.-C. coupled to the second stage switching and storage means 204. A.-C. coupling by means of coupling condenser 384 is therefore employed to block the passage of D.-C. current between the second stage switching and storage means and the second stage isolating means.

Capacitor 404 bootstraps the D.-C. level network 386, 388 and 390 to the audio output terminal 424, thus permitting the A.-C. input impedance of the isolating amplifier to remain very high even though relatively low resistor values are used to insure D.-C. stability of the amplifier. The D.-C. bias level of the input transistor 392 is set by the input resistive network resistors 386, 388 and 390. This network places a resistance of approximately 200 kilohms across the base of transistor 392 to ground. In order to prevent the lowering of the input impedance of the second stage isolating means 206 by this resistive network, the junction of resistors 388 and 390 is bootstrapped to the output terminal 424 (i.e., the input is bootstrapped to the output). Thus, when the output voltage changes, the input voltage changes by the same amount. This makes the input impedance of the second stage isolating means 206 very high in spite of the D.-C. level network at its input.

A point of importance to be noted in connection with the switch diode 324 of the first stage is that a diode having a short recovery time relative to the duration of the pulse which opens it must be utilized. With many solid state diodes, conduction does not immediately cease upon application of reverse bias, but may continue for several microseconds. This continued conduction partially discharges the storage means and a false representation of the applied input is provided. This effect is not significant in the second stage since its sample time (10 microseconds) is long compared to the recovery time of ordinary diodes.

A signal-to-noise ratio of about 60 db and a frequency response to input video modulation which is flat within 0.4 db from 8 c.p.s. to above 30 k.c.p.s. (except for the 16-c.p.s.-wide sharp nulls at integral multiples of the pulse repetition frequency) can be achieved with the circuit shown in FIG. 3 utilizing the following component values:

| | |
|---|---|
| B+ supply voltage | 24 volts. |
| Transistors: | |
| 346, 358, 458 | Type 2N366. |
| 350, 398 | Type 2N1306. |
| 392, 394, 396 | Type 2N35. |
| 442 | Type 2N274. |
| Diodes: | |
| 340, 432, 444 | Type 1N100. |
| 322, 402, 418 | Type 653. |
| 328, 336 | Type 620. |
| 324 | 1N660. |
| 360, 362, 364, 366 | Type 1N916. |
| 412 | Type 650. |

Blocking oscillator transformer—type PIC A05 resistors:

| | |
|---|---|
| 338—22K | 386—120K |
| 316—270 ohms | 390—100K |
| 344—1K | 400—6.8K |
| 342—100K | 406—22K |
| 318—1K | 408—100 ohms |
| 332—18K | 410—10K |
| 334—8.4K | 414—100 ohms |
| 330—390K | 420—100 ohms |
| 348—100K | 422—470 ohms |
| 352—820 ohms | 430—22K |
| 354—820 ohms | 438—1K |
| 368—5.6K | 440—2.7K |
| 370—1K | 450—1K |
| 372—12K | 454—1K |
| 374—10K | 456—220K |
| 380—82K | 460—22K |

Condensers:

| | |
|---|---|
| 314—0.1 mfd. | 404—25 mfd. |
| 326—180 mmf. | 416—.001 mfd. |
| 356—0.1 mfd. | 428—50 mmf. |
| 376—25 mfd. | 434—70 mmf. |
| 378—.004 mfd. | 448—.01 mfd. |
| 382—150 mmf. | 452—200 mmf. |
| 384—.002 mfd. | |

Obviously many modifications and variations of the present invention are possible in the light of the above teachings. It is therefore to be understood that within the scope of the appended claims the invention may be practiced otherwise than as specifically described.

I claim:

1. A solid-state pulse-stretching circuit comprising, in combination:
 a first boxcar stage including switching, storage and solid-state isolating means, the input to said pulse-stretching circuit being fed to said switching means, said storage means being connected to said switching means, and said isolating means being connected to said storage means;
 a second boxcar stage including switching, storage and solid-state isolating means, the output of said first stage isolating means being fed as an input to said second stage switching means, said storage means being connected to said switching means and said isolating means being connected to said storage means;
 and gating means for producing gating pulses, said gating pulses being applied to said first and second boxcar stages to open said first stage switching means to allow the input to said first stage to charge said first storage means, additionally to close said first stage switching means and open said second stage switching means to permit the output of said first stage storage means to charge said second stage storage means, and finally to close said second stage switching means and to permit discharge of said first stage storage means, said solid-state isolating means of at least said second boxcar stage having a high input impedance.

2. A circuit as set forth in claim 1, wherein said first stage switching means comprising a solid-state diode circuit, said diode having a short recovery time relative to the duration of the gating pulse which opens it.

3. A circuit as set forth in claim 1, wherein said second stage isolating means comprises a high input impedance, solid-state, emitter-follower amplifier having input and output terminals,
 negative feedback being employed from its output to its input terminal,
 said input terminal being bootstrapped to said output terminal, and
 capacitive coupling being employed to feed the signal from said second stage storage means to said amplifier input terminal.

4. A solid-state pulse-stretching circuit comprising, in combination:
 a first boxcar stage including switching, storage and solid-state isolating means, the input to said pulse-stretching circuit being fed to said switching means, said storage means being connected to said switching means and said isolating means being connected to said storage means;
 a second boxcar stage including switching, storage and solid-state isolating means, the output of said first stage isolating means being fed as an input to said second stage switching means, said storage means being connected to said switching means and said isolating means being connected to said storage means; and
 gating means for producing a pair of sequential pulses, the first pulse being fed to and operating to open said first stage switching means to allow the input to said first stage to charge said first stage storage means,
  the second pulse being fed to said first stage storage means and said second stage switching means, said second pulse operating to open said second stage switching means allowing the output of said first stage isolating means to charge said second stage storage means and the end of said second pulse operating to close said second stage switching means to the passage of said output from said first stage isolating means and to permit discharge of said first stage storage means, said solid-state isolating means of at least said second boxcar stage having a high input impedance.

5. A circuit as set forth in claim 4, wherein said first stage switching means comprises a solid-state diode circuit, said diode having a short recovery time relative to the duration of said first sequential pulse which opens it.

6. A circuit as set forth in claim 4, wherein said second stage isolating means comprises a high input impedance, a solid-state, emitter-follower amplifier having input and output terminals,
 negative feedback being employed from its output to its input terminal,
 said input terminal being bootstrapped to said output terminal,
 and capacitive coupling being employed to feed the signal from said second stage storage means to said amplifier input terminal.

7. A solid-state pulse-stretching circuit comprising, in combination:
 a first boxcar circuit comprising
  first switching means having connections to receive a first signal as an input,
  first storage means connected to receive the output of said first switching means as an input, and
  first solid-state isolating means connected to receive the output of said first storage means as an input;
 a second boxcar circuit comprising
  second switching means connected to receive the output of said first isolating means as an input, second storage means connected to receive the output of said second switching means as an input, and second solid-state isolating means connected to receive the output of said second storage means as an input, said second isolating means comprising a solid-state amplifier utilizing negative feedback, bootstrapping of output to input and capacitive input coupling to achieve a high input impedance;

first gating means having connections to receive a trigger pulse as an input, said first gating means producing a first gating pulse which is fed as an input to said first switching means, the latter being opened by, and during the duration of, said first gating pulse to pass said first signal to said first storage means whereby said first storage means is charged to a value corresponding to the value of said first signal; and second gating means having connections to receive said first gating pulse as an input, said second gating means producing a second gating pulse starting at the end of said first gating pulse, said second gating pulse being applied as an input to said second switching means, the latter being opened by, and during the duration of, said second gating pulse to pass the output of said first isolating means to said second storage means whereby said second storage means is charged to a value corresponding to the value of said first signal, said second gating signal also being applied to said first storage means to permit its discharge at the end of said second gating signal, the value of the charge stored by said second storage means remaining substantially constant until the occurrence of the next following second gating pulse.

8. A solid-state pulse-stretching circuit comprising, in combination:

a first boxcar circuit comprising first switching means having connections to receive a first signal as an input, first storage means connected to receive the output of said first switching means as an input, and first solid-state isolating means connected to receive the output of said first storage means as an input;

a second boxcar circuit comprising second switching means connected to receive the output of said first isolating means as an input, second storage means connected to receive the output of said second switching means as an input, and second solid-state isolating means connected to receive the output of said second storage means as an input, said second isolating means comprising a transistorized, unity-gain emitter-follower amplifier utilizing negative feedback, bootstrapping of output to input and capacitive input coupling to achieve a high input impedance;

first gating means having connections to receive a trigger pulse as an input, said first gating means producing a first gating pulse which is fed as an input to said first switching means, the latter being opened by, and during the duration of, said first gating pulse to pass said first signal to said first storage means whereby said first storage means is charged to a value corresponding to the value of said first signal; and second gating means having connections to receive said first gating pulse as an input, said second gating means producing a second gating pulse starting at the end of said first gating pulse, said second gating pulse being applied as an input to said second switching means, the latter being opened by, and during the duration of, said second gating pulse to pass the output of said first isolating means to said second storage means whereby said second storage means is charged to a value corresponding to the value of said first signal, said second gating signal also being applied to said first storage means to permit its discharge at the end of said second gating signal, the value of the charge stored by said second storage means remaining substantially constant until the occurrence of the next following second gating pulse.

References Cited by the Examiner

UNITED STATES PATENTS 3,011,129 11/61 Magleby et al. ---------- 328—58

FOREIGN PATENTS 866,966 5/61 Great Britain.

ARTHUR GAUSS, *Primary Examiner.*

KATHLEEN H. CLAFFY, *Examiner.*